June 10, 1930.  G. A. MELLOR  1,763,625
PISTON FOR INTERNAL COMBUSTION ENGINES
Filed April 10, 1928  2 Sheets-Sheet 1
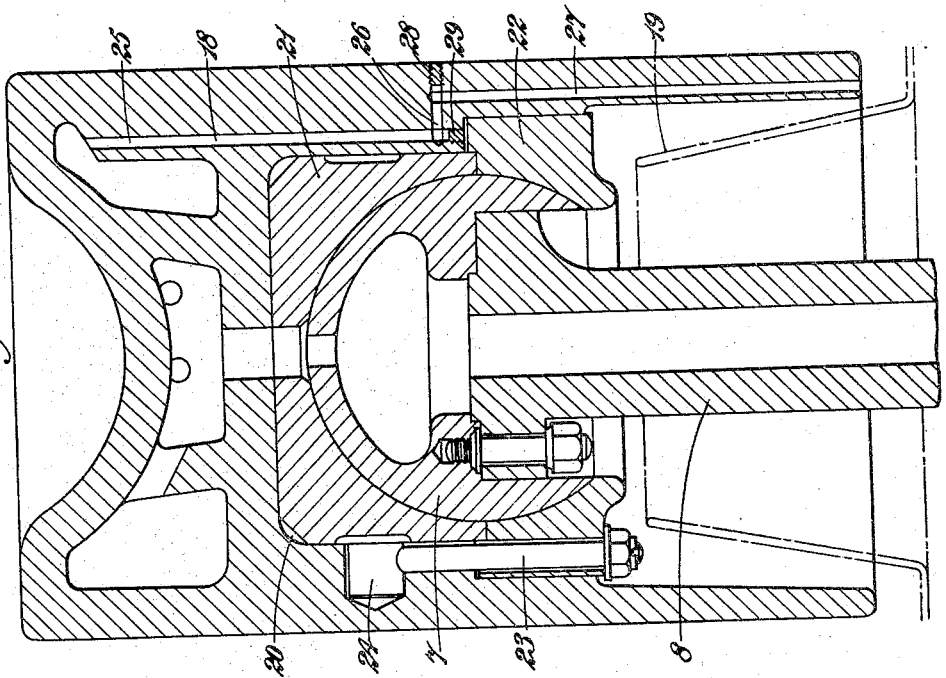
Inventor,
George A. Mellor
N. H. Lockwood
Attorney.

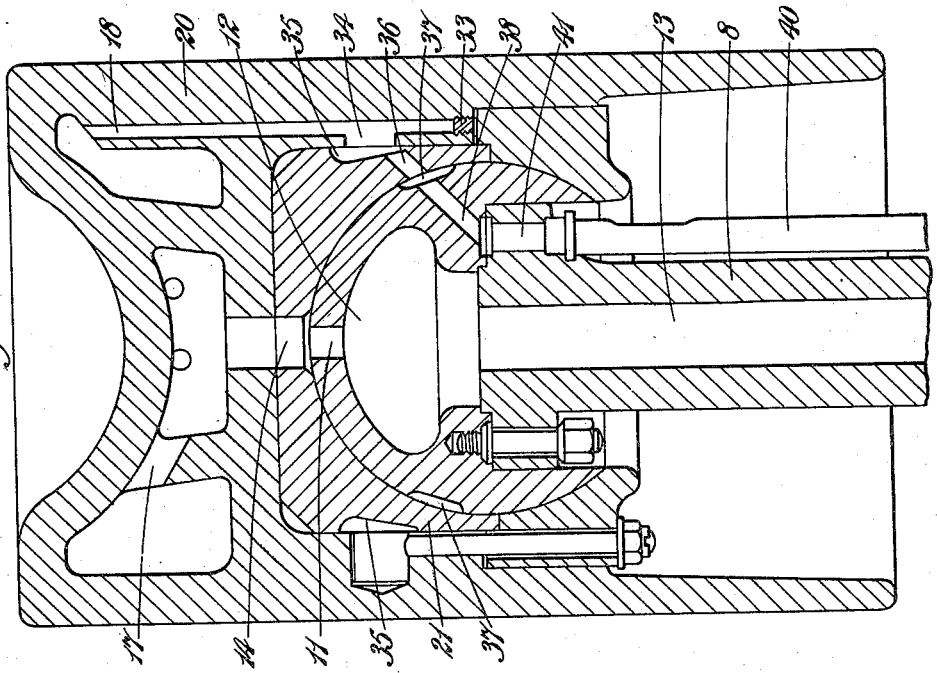

Patented June 10, 1930

1,763,625

UNITED STATES PATENT OFFICE

GEORGE ARTHUR MELLOR, OF WELLING, ENGLAND, ASSIGNOR OF ONE-HALF TO THE GENERAL ELECTRIC COMPANY LIMITED, OF LONDON, ENGLAND

PISTON FOR INTERNAL-COMBUSTION ENGINES

Application filed April 10, 1928, Serial No. 268,936, and in Great Britain April 21, 1927.

This invention relates to reciprocating engines. In such engines the connecting rod is usually pivotally connected to the piston by means of a gudgeon pin. These pins suffer from certain disadvantages, owing to the restricted space in which they must be accommodated. In the first place the alignment in high duty engines must be very exact; and, particularly in the case of high compression internal combustion engines, the load due to the gas pressure may be very high. Furthermore, large bearing surfaces cannot be provided, as there is but little space available for bearings, and it is desirable to keep their weight low.

These factors jointly necessitate extreme care and precision in the manufacture and fitting of the ordinary type of pin and its co-operating parts; and even then the pin, whether fixed at the ends or the middle, will deflect when under load, and there is then a possibility of local pressure detrimental to good bearing contact and alignment.

In large internal combustion engines it is often necessary to supply a cooling liquid to the piston head, and systems have been proposed in which oil is taken through passages in an ordinary gudgeon pin and then through other passages to the piston head. Such an arrangement is liable to become defective, since the large clearances which develop as the gudgeon pin bearings wear, by-pass the oil intended for cooling. To avoid this difficulty a complicated and expensive system of swing links and trombone pipes is usually provided.

It has also been proposed to provide an internal combustion engine with a connecting rod having a longitudinal duct therethrough and having a spherical head engaging in a spherically shaped recess in bearing members within the piston. In this arrangement a scoop was provided which was carried by the connecting rod and which periodically dipped into an oil bath in the crank case of the engine, whereby oil was forced up through the duct in the connecting rod and through co-operating ports in the spherical head and in the spherical recess to the piston head. From the piston head the oil escaped through radial openings in the piston skirt on to the walls of the engine cylinder. With arrangements of this kind, however, in which the oil escapes to the cylinder walls, it is impossible owing to the obstruction of the oil flow, to obtain a sufficiently rapid flow of oil to produce adequate cooling of the pistons of modern high-duty engines; and according to one feature of this invention, in an internal combustion engine, the piston comprises a member provided with a spherically shaped recess which engages a connecting rod having a spherical head, and an oil chamber is arranged beneath the piston head to which cooling oil is supplied and from which there is an unobstructed passage for the cooling oil.

According to another feature of the invention, the connecting rod may be provided with a longitudinal duct through which the cooling oil is supplied through ports in the spherical head of the connecting rod and in the spherically shaped recess aforesaid to the said oil chamber, and a duct for conveying away hot oil from the piston may be associated with the connecting rod as is hereinafter described.

Preferably the port in the spherical head of the connecting rod will be disposed on the axis of the connecting rod, the direct load on the piston then tends to trap the oil in the oil grooves, and on the reversal of thrust at the top of an idle stroke the lower portions of the spherical surfaces of the piston and connecting rod are pressed together, so that excessive leakage is hindered whatever the direction of the thrust.

In order that the invention may be the more readily understood, it will now be described by way of example with reference to the accompanying drawings, in which Figures 1 to 4 show longitudinal sections through four forms of trunk piston constructed in accordance with the invention.

Referring to Figure 1, it will be seen that the piston proper consists of two parts, the head 1 and the skirt 2 which are spigotted together at 3, the parts being bolted together by means of studs such as 4 which screw into a steel foundation member 5 cast in the piston head.

The plane of division between the head and the skirt of the piston is arranged to pass through the centre of the spherically shaped recess 6 which receives the spherically shaped head 7 of the connecting rod 8. Shims (not shown) may be inserted in the joint between the piston head and skirt, so that adjustments may be made as the bearing surface wears.

The spherical head 7 is attached by studs 9 to the hollow connecting rod 8, and is provided with oil holes 10 and a port 11 communicating with the chamber 12 to which oil may be supplied through the duct 13 in the connecting rod 8. This chamber 12, with oil continuously circulating through it, enables the loaded spherical surface to remain cool, and also by virtue of dissipating heat travelling from the piston head prevents distortion in itself. In the hemi-spherical seating in the piston head 1, a port 14, provided with an enlarged inlet 15 to allow for the motion of the connecting rod, is adapted to receive the oil supplied through the duct in the connecting rod, which oil serves for cooling the piston. The piston head 1 has ribs 16 as shown, which are provided with the necessary holes, such as 17, to allow the cooling oil to escape to outlet passages such as 18 having their discharge openings located within the skirt 2 of the piston as shown in the drawings, the oil being collected and led to a suitable oil cooler (not shown) the upper end of the collector 19 being indicated in chain dot on Figure 1.

In the arrangement shown in Figure 2, the piston 20 is formed in one piece, and two-part bush engages the spherical head 7 of the connecting rod 8. As shown, the upper part 21 of the bush is retained in the piston 20 by the lower part 22 of the bush which is in turn held in place by bolts, such as 23, which have a cylindrical head 24, at right angles to the bolt shank. Cooling oil is supplied in substantially the same manner as is described in connection with Figure 1; but it will be seen that in this case, in order to avoid having an oil duct passing through part 22, each outlet duct 18 consists of three holes 25, 26 and 27, drilled in the body of the piston and plugged at 28 and 29.

Figures 3 and 4 show alternative methods of supplying cooling oil to a piston provided with a two-part bush of the kind described in connection with Figure 2. In the arrangement shown in Figure 3, a ring 30 is mounted in the end of the duct 13 in the connecting rod 8, the ring being held in place by set-screws such as 31; and an oil supply pipe 32 is screwed into this ring, and communicates with the chamber 12. Oil flows from the chamber 12 through the ports 11 and 14 to cool the piston head, and thence through the holes 17 to the outlet ducts 18, which are plugged as at 33. Passages such as 34 conduct the oil from the ducts 18 to a channel 35 passing round the upper part 21 of the bush, and passages 36 connect the channel 35 with a second channel 37 and passages 38 in the spherical head 7. The oil finally flows back through the passages 39 in the connecting rod 8, to the annular space between the walls of the duct 13 and the supply pipe 32, and passes down the connecting rod and away to the oil cooler. An oil collector such as that used with the arrangements shown in Figures 1 and 2 is, of course, not needed with this arrangement. In the alternative form shown in Figure 4, the oil is returned through an external pipe 40, connected by ducts 41 with the passages 38, the rest of the arrangement being the same as that shown in Figure 3, save that the ring 30, set-screws 31, and oil supply pipe 32 are not required.

In all the arrangements which have been described above, the piston is free to rotate about its axis without restraint from the connecting rod; keys or feathers may, however, be provided if this freedom is undesirable.

I claim:—

1. In an internal combustion engine, a piston adapted to be cooled by circulating oil therethrough, comprising a member provided with a spherically shaped recess, in combintion with a connecting rod having a hollow spherical head engaging with said recess, an oil chamber beneath the piston head, means for supplying cooling oil to said chamber through said hollow head, and an unobstructed outlet passage for the cooling oil from said chamber to provide for free circulation of the oil.

2. In an internal combustion engine, a piston adapted to be cooled by circulating oil therethrough, comprising a member provided with a spherically shaped recess, in combination with a connecting rod having a hollow spherical head engaging with said recess, a port in said recess, a port in the surface of said spherical head, an oil chamber beneath the piston head, means for supplying cooling oil to the interior of said spherical head and through said ports to said chamber, and an outlet passage from said chamber for the cooling oil, said outlet passage having its discharge opening located within the skirt of said piston and providing for free circulation of the oil.

3. A piston for an internal combustion engine adapted to be cooled by circulating oil therethrough, comprising a member provided with a spherically shaped recess, an oil chamber beneath the piston head, a port connecting said recess to said chamber, and an outlet passage from said chamber, said passage having its inlet located in the upper part of said chamber and its outlet located within the skirt of said piston and adapted to provide for free circulation of the oil.

GEORGE ARTHUR MELLOR.